UNITED STATES PATENT OFFICE.

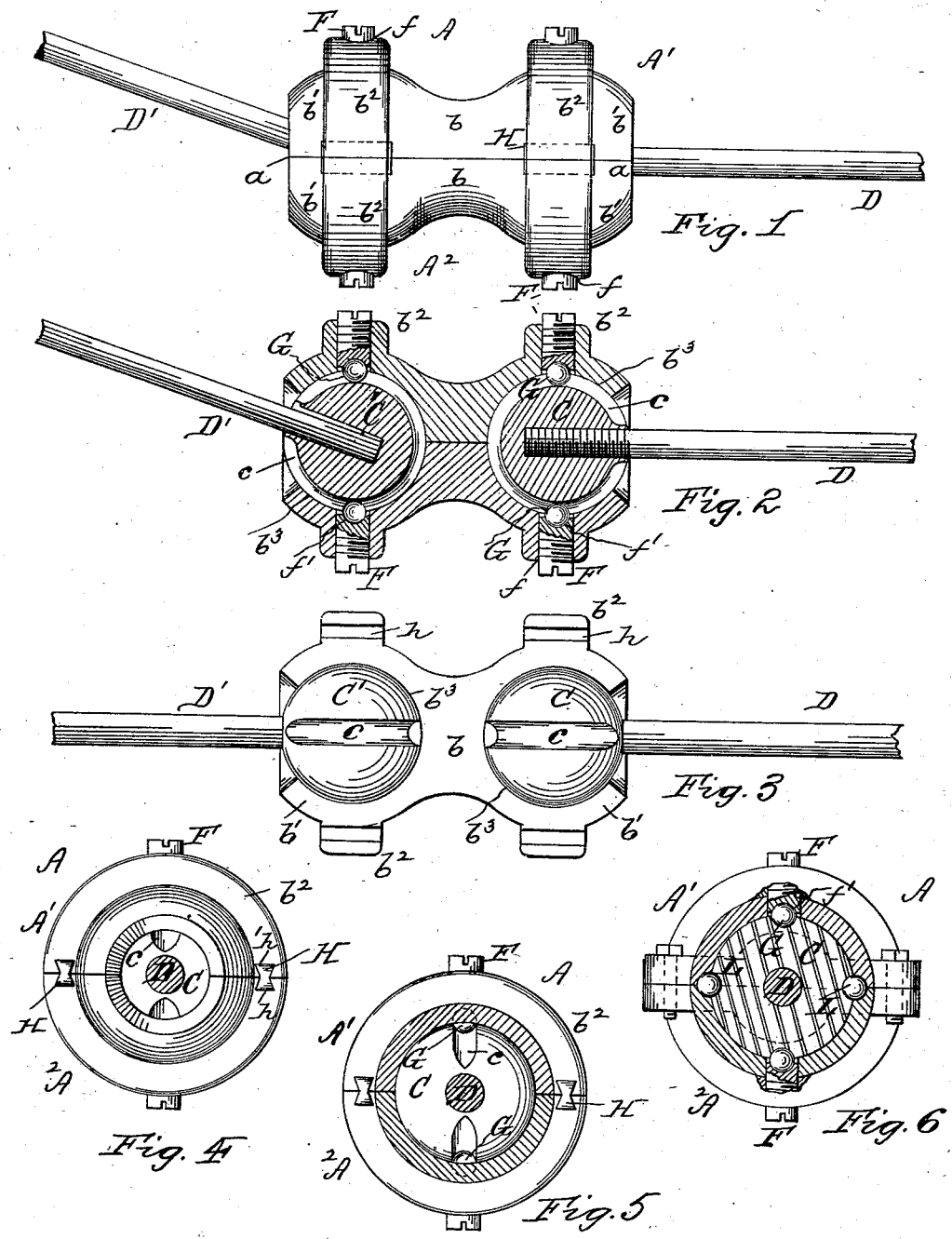

FRANCIS O. DESCHAMPS, OF PHILADELPHIA, PENNSYLVANIA.

SHAFT-COUPLING.

SPECIFICATION forming part of Letters Patent No. 255,103, dated March 21, 1882.

Application filed August 19, 1881. (No model.)

*To all whom it may concern:*

Be it known that I, FRANCIS O. DESCHAMPS, a citizen of the United States, residing at Philadelphia, in the county of Philadelphia and State of Pennsylvania, have invented certain new and useful Improvements in Shaft-Couplings, of which the following is a specification, reference being had to the accompanying drawings, wherein—

Figure 1 is an elevation of my improved shaft-coupling. Fig. 2 is a vertical longitudinal section. Fig. 3 is a plan on the line $a\,a$, Fig. 1. Fig. 4 is an end view of the coupler. Fig. 5 is a transverse vertical section, and Fig. 6 is a similar view of a modification of my invention.

My invention has relation to that form of shaft-couplings shown in Patent No. 206,093, granted to me on the 16th day of July, 1878; and it has for its object to simplify the construction of the same, so as to cheapen the cost of manufacture of the coupling and render the same more durable.

My invention accordingly consists in the novel combination, construction, and arrangement of parts hereinafter more particularly described.

Referring to the accompanying drawings, A represents the coupling device, divided longitudinally on the line $a\,a$, so as to form two sections, $A'\,A^2$. Each section is composed of a solid central part, $b$, semi-spherical ends $b'\,b'$, and flanges $b^2\,b^2$, which correspondingly coincide with each other when said sections are secured together, as hereinafter described, whereby a twin coupling attachment, A, is obtained having sockets $b^3\,b^3$ at either end and external annular flanges, $b^2$. Said sockets receive the spheres or balls C C', keyed or screwed, as desired, upon their respective shafts D D', which are designed to be coupled together. Said balls are formed with grooves $c$, and the sections $A'\,A^2$ are provided with threaded openings $f\,f$, passing through the flanges $b^2$, into which are screwed steel pins or plugs F F, whose lower ends are formed with a concavity, $f'$.

G G are small spheres, one half of which are contained in the cavities $f'$ of pins F, and the other half in the grooves $c$ of balls C C', and which thereby act as keys to retain the balls C C' within the sockets $b^3\,b^3$, to couple the shafts D D', so that when one is driven the other will rotate therewith.

The sections $A'\,A^2$ are secured together in any suitable manner; but I prefer to accomplish that result by means of X-shaped keys H, which are driven into coinciding dovetail slots $h\,h'$, formed in the flanges $b^2\,b^2$ of said sections, as plainly shown in Figs. 1, 4, and 5; or, if desired, said sections may be screwed together, the screws either passing through the central part, $b$, or lugs formed thereon. The latter mode of so securing the sections is shown in Fig. 6. As the small spheres G G wear, the pins F F are screwed up or adjusted to take up such wear. Consequently there will be no lost motion of said spheres within the coupling.

If desired, the balls C C' may be formed with one, two, or four slots each, and the sections $A'\,A^2$ will then be constructed with additional cavities, to correspond with such slots in the balls, for the reception of the additional spheres G G then used. Such construction is shown at L, Fig. 6.

The coupling device so constructed possesses many advantages over that described and shown in above-named patent, viz: The two parts of the coupling are practically in one piece, so that when brought together a twin coupler is formed wherein the sockets $b^3\,b^3$ are cast integrally with sections $A'\,A^2$. Consequently I am able to dispense with the caps or covers for the sockets of the couplers shown in said patent. Not using such caps, the expense of fitting them to the couplers is saved, thereby resulting in lessening the cost of manufacture of such devices to a considerable degree. The provision of taking up the lost motion of the spheres G G makes the coupler much more durable than would otherwise be the case if such contingency were not provided for.

What I claim as my invention is—

1. A coupling attachment, A, composed of sections $A'\,A^2$, having semi-spherical ends $b'\,b'$, with flanges $b^2\,b^2$, provided with adjustable pins or plugs F F, having semi-spherical cavities $f'\,f'$ in their ends, substantially as shown and described.

2. The combination, in a shaft-coupling, with the sections $A'\,A^2$, constructed and secured together substantially as shown and described, of shafts or rods D D', provided with grooved balls C C', and keys or spheres G G, substantially as and for the purpose set forth.

3. The coupling A, composed of sections A' A², having socketed ends $b^3 b^3$, and flanges $b^2 b^2$, provided with openings $f f$, which receive adjustable plugs or pins F F, in combination with means, substantially as shown and described, for locking said sections together, substantially as set forth.

4. The coupling A, composed of sections A' A², having ends $b' b'$, with sockets $b^3 b^3$, and openings $f f$ in flanges $b^2 b^2$, adjustable plugs F, with cavities $f'$, balls C C', formed with grooves, key-spheres G G, and means for locking said sections together, substantially as shown and described.

5. The twin coupling device herein shown and described, composed of sections A' A², having the socketed ends $b^3 b^3$, flanges $b^2 b^2$, formed integrally therewith, and provided with adjustable plugs F, with socketed ends $f'$, and, in combination therewith, balls C C', grooved as shown, for the reception of the keys or spheres G G, substantially as set forth.

In testimony that I claim the foregoing I have hereto set my hand this 17th day of August, 1881.

FRANCIS O. DESCHAMPS.

Witnesses:
SAML. B. S. BARTH,
F. L. B. KEFFER.